US012560811B1

(12) United States Patent
Carlsson et al.

(10) Patent No.: US 12,560,811 B1
(45) Date of Patent: Feb. 24, 2026

(54) DETECTION AND MITIGATION OF VISIBILITY IMPAIRMENTS IN HEADS-UP DISPLAYS

(71) Applicant: Distance Technologies Oy, Helsinki (FI)

(72) Inventors: Thomas Carlsson, Vantaa (FI); Mikko Strandborg, Hangonkylä (FI); Urho Konttori, Helsinki (FI)

(73) Assignee: Distance Technologies Oy, Helsinki (FI)

( * ) Notice: Subject to any disclaimer, the term of this patent is extended or adjusted under 35 U.S.C. 154(b) by 0 days.

(21) Appl. No.: 19/237,877

(22) Filed: Jun. 13, 2025

(51) Int. Cl.
| | |
|---|---|
| *H04N 13/383* | (2018.01) |
| *G02B 27/00* | (2006.01) |
| *G02B 27/01* | (2006.01) |
| *G06F 3/01* | (2006.01) |
| *G06F 9/30* | (2018.01) |

(52) U.S. Cl.
CPC ..... *G02B 27/0101* (2013.01); *G02B 27/0093* (2013.01); *G02B 2027/0138* (2013.01)

(58) Field of Classification Search
CPC ............ G02B 27/0101; G02B 27/0093; G02B 2027/0138
USPC .......................................................... 359/630
See application file for complete search history.

(56) References Cited

U.S. PATENT DOCUMENTS

2020/0128231 A1* 4/2020 Pace .................... H04N 13/383

* cited by examiner

*Primary Examiner* — Bumsuk Won
*Assistant Examiner* — Grant A Gagnon
(74) *Attorney, Agent, or Firm* — Ziegler IP Law Group, LLC.

(57) ABSTRACT

A system includes a tracker, a display, an optical combiner, at least one camera, and at least one processor. The optical combiner is arranged on an optical path of the display and on an optical path of a real-world light field of a real-world environment, and includes a semi-reflective surface. The camera is arranged facing the semi-reflective surface. The at least one processor is configured to determine relative positions of eyes of at least one user with respect to the semi-reflective surface, generate or retrieve an image, determine a portion of the semi-reflective surface from which light rays of a graphical element identified as important are to be reflected toward a given eye, detect when a luminance of a portion of the real-world light field exceeds a threshold luminance, identify a non-occupied region of the image, modify the image to reposition the graphical element, and display the image.

10 Claims, 5 Drawing Sheets

500

DETECTION AND MITIGATION OF VISIBILITY IMPAIRMENTS IN HEADS-UP DISPLAYS

TECHNICAL FIELD

The present disclosure relates to systems for detecting and overcoming visibility impairments in heads-up displays. The present disclosure also relates to methods for detecting and overcoming visibility impairments in heads-up displays.

BACKGROUND

Heads-up displays are used in vehicles and wearable systems to present visual information within a line of sight of a user, such as a driver and a passenger of the vehicle. The heads-up displays rely on optical elements to reflect or project visual content while maintaining partial transparency to allow simultaneous observation of a real-world environment by the user. In many operational scenarios, the visibility of the heads-up display is limited due to environmental factors such as direct sunlight, headlights of oncoming vehicles, smudges, dirt, or external objects on an optical path of the heads-up display that obstruct a view of the real-world environment through the heads-up display. Further, presence of high ambient luminance or static occlusions such as sun visors or objects hanging in the optical path of the heads-up display can impair legibility of information presented through the heads-up display.

Additionally, a limited visibility of the heads-up display under environmental conditions that impair a transparency or reflectivity of optical elements affects the ability of the user to perceive visual content that is of operational relevance. For example, identification of key information such as a vehicle speed, a navigation guidance indicator, or a warning indicator becomes difficult for the user when one or more portions of the heads-up display are partially or entirely unreadable due to the aforesaid environmental conditions. The inability of the user to reliably perceive important visual content through the heads-up display reduces an operational awareness of the user and may impair a decision-making capability of the user in safety-critical environments.

Further, in operating scenarios involving a high glare condition, a partial obstruction of the optical element, or a variable lighting condition in the surrounding environment, one or more auxiliary sensors or one or more interface adjustments may be employed by a display system to improve a quality of a visual output of the heads-up display. However, an effective presentation of important visual content to the user remains a challenge, particularly when the visibility of the heads-up display is affected by an unpredictable or non-uniform visibility impairment across the heads-up display.

Therefore, a need exists to improve a readability and an accessibility of visual content presented via heads-up displays, especially in environments where an environmental condition or a physical obstruction interferes with a clear observation of the displayed information by the user. Systems are required that are capable of maintaining a visibility of critical information in the presence of visibility impairments affecting the optical element of the heads-up display, without requiring a manual intervention by the user.

SUMMARY

The present disclosure seeks to provide a system for detecting and overcoming visibility impairments in heads-up displays. The system comprises a display, an optical combiner, at least one camera, a tracker, and at least one processor configured to detect a luminance of a portion of a real-world light field that is higher than a predefined threshold luminance and to modify an image to reposition a graphical element identified as important. The present disclosure also seeks to provide a method for detecting and overcoming visibility impairments in heads-up displays. The method comprises determining relative positions of eyes of at least one user with respect to a semi-reflective surface of the optical combiner, detecting a luminance above a predefined threshold luminance, and modifying an image to reposition a graphical element identified as important. The aim of the present disclosure is achieved by the system and the method as defined in the appended independent claims to which reference is made. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1:
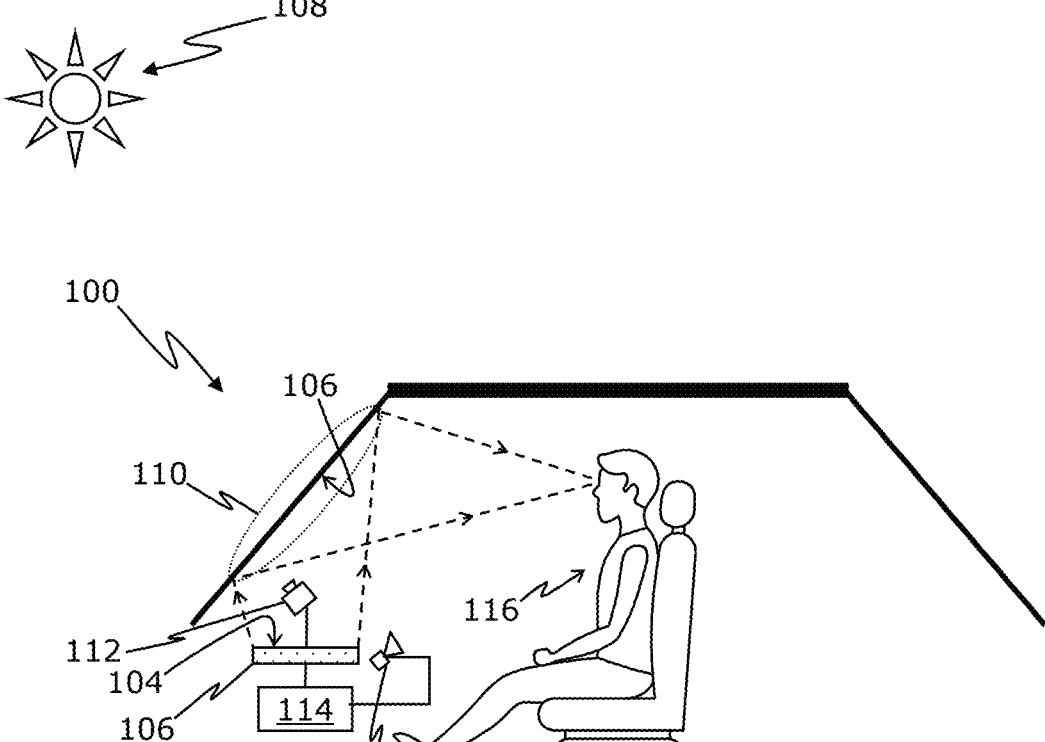
FIG. 1 shows an exemplary implementation of a system, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides system comprising:
    a tracker;
    a display;
    an optical combiner arranged on an optical path of the display and on an optical path of a real-world light field of a real-world environment, the optical combiner having a semi-reflective surface;
    at least one camera arranged facing the semi-reflective surface; and
    at least one processor configured to:
        determine relative positions of eyes of at least one user with respect to the semi-reflective surface, using the tracker;

generate or retrieve an image to be displayed;

for a given region of the image that represents a graphical element identified as important or having an importance level higher than a first predefined threshold importance level, determine a given portion of the semi-reflective surface from which light rays of the given region of the image are to be reflected toward a given eye of the at least one user during display of the image, based on a relative position of the given eye with respect to the semi-reflective surface, a relative position and orientation of the semi-reflective surface with respect to the display, and a position of the given region in the image;

capture at least one real-world image using the at least one camera;

detect when a luminance of a given portion of the real-world light field passing through the given portion of the semi-reflective surface toward the given eye is higher than a first predefined threshold luminance, based on the at least one real-world image and the relative position of the given eye with respect to the semi-reflective surface;

when it is detected that the luminance of the given portion of the real-world light field is higher than the first predefined threshold luminance, identify a non-occupied region of the image, wherein a luminance of a corresponding portion of the real-world light field passing through a corresponding portion of the semi-reflective surface is lower than a second predefined threshold luminance, wherein the non-occupied region of the image is identified based on the at least one real-world image, the relative position of the given eye with respect to the semi-reflective surface, the relative position and orientation of the semi-reflective surface with respect to the display, a position of the non-occupied region in the image, and a size of the graphical element; and modify the image to reposition the graphical element at the non-occupied region of the image; and display the image via the display for producing a synthetic light field, wherein the optical combiner is employed to reflect the synthetic light field toward the eyes of the at least one user, whilst optically combining the synthetic light field with the real-world light field.

In a second aspect, the present disclosure provides a method comprising:

determining relative positions of eyes of at least one user with respect to a semi-reflective surface of an optical combiner, using a tracker, wherein the optical combiner is arranged on an optical path of a display and on an optical path of a real-world light field of a real-world environment;

generating or retrieving an image to be displayed via the display;

for a given region of the image that represents a graphical element identified as important or having an importance level higher than a first predefined threshold importance level, determining a given portion of the semi-reflective surface from which light rays of the given region of the image are to be reflected toward a given eye of the at least one user during display of the image, based on a relative position of the given eye with respect to the semi-reflective surface, a relative position and orientation of the semi-reflective surface with respect to the display, and a position of the given region in the image;

capturing at least one real-world image using at least one camera, wherein the at least one camera is arranged facing the semi-reflective surface;

detecting when a luminance of a given portion of the real-world light field passing through the given portion of the semi-reflective surface toward the given eye is higher than a first predefined threshold luminance, based on the at least one real-world image and the relative position of the given eye with respect to the semi-reflective surface;

when it is detected that the luminance of the given portion of the real-world light field is higher than the first predefined threshold luminance, identifying a non-occupied region of the image, wherein a luminance of a corresponding portion of the real-world light field passing through a corresponding portion of the semi-reflective surface is lower than a second predefined threshold luminance, wherein the non-occupied region of the image is identified based on the at least one real-world image, the relative position of the given eye with respect to the semi-reflective surface, the relative position and orientation of the semi-reflective surface with respect to the display, a position of the non-occupied region in the image, and a size of the graphical element; and modifying the image to reposition the graphical element at the non-occupied region of the image; and displaying the image via the display for producing a synthetic light field, wherein the optical combiner is employed to reflect the synthetic light field toward the eyes of the at least one user, whilst optically combining the synthetic light field with the real-world light field.

The present disclosure provides the aforementioned system and the aforementioned method, which enable modification of an image based on luminance conditions of a real-world light field, thereby facilitating reliable reflection of graphical elements toward a given eye of the at least one user based on a relative position of the eye with respect to a semi-reflective surface. The system is applicable in head-up displays installed in vehicles, augmented reality glasses for outdoor or industrial environments, and cockpit display units in aircraft requiring accurate and uninterrupted rendering of graphical elements on a real-world light field. By repositioning a graphical element in an image based on luminance levels of real-world light field passing through different portions of a semi-reflective surface, the system enables that the graphical element is reflected toward a given eye of the at least one user through a portion of the semi-reflective surface that associated with a lower luminance. This enables consistent display of the graphical element under high-luminance conditions in a real-world environment. By identifying a non-occupied region of the image corresponding to a portion of the semi-reflective surface where the luminance of the real-world light field remains below a second predefined threshold luminance, the system maintains uninterrupted reflection and position of the graphical element under changing real-world light field conditions, such that the graphical element is reflected toward a given eye of the at least one user with consistent alignment, without relying on fixed placement logic, static image positioning, or predefined assumptions about luminance uniformity. The automatic repositioning of the graphical element also prevents degradation in visibility caused by bright external conditions, such as glare or environmental illumination, and enhances reliability of graphical content delivery without user intervention.

Advantageously, by selecting a non-occupied region of the image corresponding to a portion of the semi-reflective surface through which the luminance of the real-world light field remains below a second predefined threshold luminance, the system avoids reflection through portions associated with high luminance and maintains visibility of the graphical element. The image is modified to reposition the graphical element at the identified region and displayed via the display to produce a synthetic light field that is optically combined with the real-world light field. As a result, the graphical element is reflected toward a given eye of the at least one user with accurate position, even under luminance conditions that interfere with reflection uniformity. Further, by determining whether the importance level of the graphical element exceeds a predefined threshold importance level, the system and the method perform repositioning only when such condition is satisfied, thereby avoiding unnecessary modification of graphical elements below the threshold.

The system allows to maintain visibility of graphical elements presented via a heads-up display implemented in vehicles or wearable systems where graphical elements are visually combined with the real-world light field. The term "real-world light field" as used throughout the present disclosure, relates to light rays entering the system from the real-world environment, which pass through the semi-reflective surface and are perceived by the at least one user in combination with the synthetic light field. The system detects and responds to visibility impairments affecting the semi-reflective surface of the optical combiner. The visibility impairments refer to environmental or situational factors that reduce visibility of graphical elements, including glare from ambient light sources, partial obstruction by physical objects positioned near the optical combiner or the display, or accumulation of dust and dirt on the semi-reflective surface. The system is applicable to heads-up displays.

The system continuously assesses real-world viewing conditions and modifies the placement of graphical elements based on the visibility of respective portions of the semi-reflective surface through which graphical elements are to be viewed. When the system detects that the given portion of the semi-reflective surface corresponds to a region of elevated luminance or reduced transparency, the system identifies an alternate portion of the semi-reflective surface having a lower luminance and sufficient spatial extent for repositioning. A corresponding non-occupied region of the image is then selected for display of the graphical element. The term "non-occupied region" as used throughout the present disclosure, relates to a region of the image that either does not represent any graphical element or represents a graphical element not identified as important or having an importance level lower than the second predefined threshold importance level.

The identification of the non-occupied region is performed by considering the size of the graphical element and the spatial relationship between the non-occupied region and the original location of the graphical element. The repositioning of the graphical element based on proximity to the original location provides an advantage of maintaining the perceptual continuity of graphical content and allows the at least one user to maintain situational awareness. The system thereby enables a display behaviour that adapts dynamically to environmental lighting changes or transient obstructions without requiring user intervention.

In operating scenarios where graphical elements are affected by reflections from external sources such as sunlight or from internal occluders such as articles placed near the display, the system advantageously maintains readability by relocating the graphical elements to regions that remain visually accessible. The identification of darker regions of the semi-reflective surface based on the second predefined threshold luminance and the evaluation of spatial placement constraints collectively support the adaptive positioning of graphical content. The term "second predefined threshold luminance" as used throughout the present disclosure, relates to a luminance value that defines portions of the semi-reflective surface as sufficiently dark for presenting graphical elements identified as important. The adaptation based on the second predefined threshold luminance enables uninterrupted presentation of graphical elements having higher importance levels or those identified as important.

When the system determines that no non-occupied region is available for repositioning the graphical element, the system presents the visual indicator in the neighbouring region of the image to notify the at least one user of presence of the graphical element at the original location. The visual indicator prompts the at least one user to take corrective action, such as adjusting head position, to view the obscured graphical element. Advantageously, the presentation of the visual indicator in the neighbouring region of the image maintains user awareness when visibility constraints prevent repositioning, thereby extending the operational robustness of the system.

The presentation of the graphical elements is performed through generation or retrieval of the image corresponding to the current viewing geometry of the at least one user. The image is displayed via the display to produce the synthetic light field that is optically combined with the real-world light field by the optical combiner. The term "synthetic light field" as used throughout the present disclosure, relates to light rays representing the graphical elements of the image generated or retrieved by the system, which are displayed via the display and reflected by the semi-reflective surface toward the eyes of the at least one user. The resulting combination provides an advantage of allowing the at least one user to observe the graphical elements in alignment with the real-world environment. The system thereby enables graphical content to remain accessible and legible despite environmental variability in lighting, obstruction, or contrast conditions.

A technical benefit of the system is the real-time adaptation of the image based on detected visibility impairments associated with the semi-reflective surface of the optical combiner. A further technical benefit of the system is the preservation of graphical legibility and content continuity across the field of view of the at least one user, without requiring manual input. An additional technical benefit is the support for the visual indicators when repositioning is not possible, which enhances usability and situational responsiveness of the heads-up display in diverse real-world environments.

The present disclosure further provides the method for responding to visibility impairments encountered in heads-up displays. The method provides the technical benefit of maintaining visibility of graphical elements identified as important under changing real-world lighting conditions without requiring manual intervention by the at least one user. A further technical benefit of the method is enabling adaptation of repositioning of the graphical elements based on detection of visibility of the graphical elements by the at least one user, thereby improving situational awareness of the at least one user.

Optionally, the at least one processor is configured to:

when it is detected that the luminance of the given portion of the real-world light field is higher than the first predefined threshold luminance, identify a plurality of portions of the semi-reflective surface for which a luminance of corresponding portions of the real-world light field passing therethrough toward the given eye is lower than the second predefined threshold luminance, based on the at least one real-world image and the relative position of the given eye with respect to the semi-reflective surface, wherein the second predefined threshold luminance is lower than the first predefined threshold luminance;

identify a plurality of regions of the image, wherein light rays of the plurality of regions of the image are to be reflected from respective ones of the plurality of portions of the semi-reflective surface toward the given eye of the at least one user during display of the image; and when identifying the non-occupied region, select the non-occupied region from the plurality of regions of the image, based on the size of the graphical element.

The second predefined threshold luminance defines dark regions of the semi-reflective surface. The dark regions refer to portions of the semi-reflective surface through which the luminance of the real-world light field is relatively low with respect to other portions of the semi-reflective surface. The dark regions are characterised by the luminance that does not exceed the second predefined threshold luminance and are therefore more suitable for presenting graphical elements identified as important. The at least one processor is further configured to identify the plurality of regions of the image from which light rays are to be reflected from respective ones of the plurality of portions of the semi-reflective surface toward the given eye during display of the image. The non-occupied region is selected from the plurality of regions based on the size of the graphical element identified as important.

The identification of the plurality of regions of the image based on the luminance of the corresponding portions of the semi-reflective surface enables a technical benefit of repositioning the graphical element identified as important to the region where visibility of the graphical element is improved due to lower luminance of the region. The selection of the non-occupied region from the plurality of regions based on the size of the graphical element further enables a technical benefit of avoiding repositioning into a region that is too small or partially affected by luminance variations, thereby improving readability and visual consistency of the graphical element identified as important for the at least one user.

Optionally, the non-occupied region of the image is identified based further on a proximity of the non-occupied region to the given region of the image.

The term "proximity" as used throughout the present disclosure, relates to a spatial distance between the non-occupied region and the given region of the image representing the graphical element identified as important. The identification of the non-occupied region based on the proximity allows the graphical element identified as important to be repositioned at a location that is spatially closer to an original location thereof within the image.

The identification of the non-occupied region based on the proximity to the given region enables a technical benefit of maintaining the graphical element identified as important near an original location thereof within a field of view of the at least one user, thereby improving a continuity of user perception. A further technical benefit is allowing a smoother visual transition of the graphical element during repositioning, reducing distraction and enhancing user experience during operation of the heads-up display.

Optionally, the at least one processor is configured to:

identify a given reflection region on the semi-reflective surface from which light rays emitted by a light-emitting surface of the display is reflected toward the given eye, based on: (a) the relative position of the given eye with respect to the semi-reflective surface, (b) the relative position and orientation of the semi-reflective surface with respect to the display, (c) a size and curvature of the semi-reflective surface, and (d) a size and curvature of the light-emitting surface;

when it is detected that the luminance of the given portion of the real-world light field is higher than the first predefined threshold luminance, determine a modified reflection region on the semi-reflective surface by excluding, from the given reflection region, the given portion of the semi-reflective surface from which the light rays of the given region of the image are to be reflected toward the given eye;

determine a three-dimensional (3D) view frustum corresponding to the given eye, based on the modified reflection region on the semi-reflective surface, and the relative position of the given eye with respect to the semi-reflective surface;

for a given virtual depth at which the graphical element is to be presented, determine a frustum cross-section of the 3D view frustum at the given virtual depth relative to the given eye;

determine at least one position on the frustum cross-section corresponding to the non-occupied region of the image;

position at least one spatial anchor at the at least one position on the frustum cross-section;

determine a position for the graphical element on the frustum cross-section relative to the at least one spatial anchor; and when modifying the image, reposition the graphical element at the determined position.

The at least one processor is configured to respond to a visibility impairment by restricting the region of the semi-reflective surface that is used for reflecting light rays of the graphical element identified as important toward the given eye. The at least one processor determines the given reflection region based on the relative position of the given eye with respect to the semi-reflective surface, the relative position and orientation of the semi-reflective surface with respect to the display, and the size and curvature of the semi-reflective surface and the light-emitting surface. The term "given reflection region" as used throughout the present disclosure, relates to a portion of the semi-reflective surface from which light rays of the graphical element identified as important are to be reflected toward the given eye based on viewing geometry and optical alignment conditions. Further, when the portion of the semi-reflective surface is affected by the visibility impairment as determined by the luminance value higher than the first predefined threshold luminance, the portion of the semi-reflective surface is excluded from the given reflection region to form the modified reflection region. The term "modified reflection region" as used throughout the present disclosure, relates to a portion of the semi-reflective surface obtained by excluding the portion affected by the visibility impairment, such that the resulting region defines an adjusted reflective surface used to maintain visibility of the graphical element identified as important.

The at least one processor determines the 3D view frustum corresponding to the given eye based on the modified reflection region and the relative position of the given eye, and computes the frustum cross-section at the given virtual depth. The term "3D view frustum" as used throughout the present disclosure, relates to a pyramidal volume extending from the given eye into the 3D space of the system field of view, constrained by the geometry of the semi-reflective surface and used to evaluate where graphical elements may be viewed. The term "frustum cross-section" as used throughout the present disclosure, relates to a planar intersection of the 3D view frustum at a given virtual depth, which defines a surface onto which candidate positions for the graphical element identified as important may be mapped. The at least one processor identifies at least one position on the frustum cross-section corresponding to the non-occupied region of the image, positions at least one spatial anchor at the identified position, and repositions the graphical element identified as important relative to the spatial anchor. The term "spatial anchor" as used throughout the present disclosure, relates to a designated position within the frustum cross-section at the given virtual depth, which serves as a geometric reference for repositioning the graphical element identified as important.

When the luminance of the given portion of the real-world light field is not higher than the first predefined threshold luminance, the given reflection region is used instead of the modified reflection region for determining the 3D view frustum and for identifying the at least one position on the frustum cross-section, positioning the at least one spatial anchor at the identified position, and repositioning the graphical element identified as important relative to the spatial anchor. The determination of the spatial anchor based on the reflection region that excludes portions affected by high luminance enables a technical benefit of maintaining visibility of the graphical element identified as important under conditions of reduced display surface availability. A further technical benefit is that the graphical element identified as important is repositioned within a valid and stable region, improving readability and user experience during operation of the heads-up display.

Optionally, the at least one processor is configured to:
when it is detected that the luminance of the given portion of the real-world light field is higher than the first predefined threshold luminance,
determine when a non-occupied region cannot be identified in the image to reposition the graphical element; and
when it is determined that a non-occupied region cannot be identified,
identify a neighbouring region of the image adjacent to the given region of the image; and
modify the image to present a visual indicator in the neighbouring region, wherein the visual indicator is presented to notify the at least one user about the graphical element being presented at the given region of the image.

Under conditions where no non-occupied region of the image can be identified for repositioning, the system responds by presenting a visual indicator in a region adjacent to the given region of the image representing the graphical element identified as important. The visual indicator is a separate graphical cue configured to notify the at least one user that the graphical element identified as important remains present at an original location thereof but may currently be obscured due to visibility impairments. The term "visual indicator" as used throughout the present disclosure, relates to a graphical cue distinct from the graphical element identified as important, which is presented in an adjacent region of the image to notify the at least one user of the presence of the graphical element at its original location. The visual indicator may prompt a corrective action by the at least one user, such as a change in viewing angle or head position, to bring the graphical element into a visible portion of the semi-reflective surface. The system thereby enables notification of occluded graphical content in real time, allowing the graphical element identified as important to remain cognitively accessible. A technical benefit of the visual indicator is that situational awareness is preserved even when environmental or geometric constraints prevent repositioning of the graphical element, thereby ensuring continuous availability of critical visual information.

In an example, the system is implemented as a three-dimensional (3D) heads-up display using an autostereoscopic display or, alternatively, based on a traditional two-dimensional (2D) display.

The term "tracker" refers to a device or system configured to determine a relative position of a given eye of at least one user with respect to a semi-reflective surface of the optical combiner. The tracker can be implemented as any known eye-tracking system capable of detecting eye positions, eye movements, or gaze directions with respect to the optical combiner.

The term "display" refers to a device configured to emit light rays representing an image for reflection by a semi-reflective surface of the optical combiner toward the eyes of at least one user. Optionally, the display is implemented as a light field display unit, such as a hogel-based, lenticular array-based, parallax barrier-based, hologram-projector-based, scanning-laser-based, or CRT-like light field display unit. Optionally, the display is an autostereoscopic display for 3D content or a traditional 2D display.

The term "optical combiner" refers to a semi-transparent device configured to reflect a portion of the synthetic light field produced by the display toward the given eye of at least one user, whilst simultaneously allowing transmission of the real-world light field from the real-world environment toward the given eye. Optionally, the optical combiner is implemented by way of at least one of: a semi-transparent mirror, a semi-transparent film, a semi-transparent flexible membrane, a beam splitter, a lens, a mirror, a prism, an optical waveguide, or a polarizer.

Optionally, the optical combiner may be a curved or flat surface. In some implementations, the windshield of a vehicle may function as the optical combiner.

The term "camera" refers to a device configured to capture at least one real-world image of a semi-reflective surface of an optical combiner, where the semi-reflective surface lies within a field of view of the camera. In an example, the at least one camera comprises a controllable exposure setting, allowing effective detection of portions of the real-world light field having the luminance exceeding the threshold luminance. For example, multiple cameras may be arranged to collectively cover an entirety of the semi-reflective surface. In one example, multiple cameras may be placed in proximities of typical head positions of respective users to improve coverage. In another example, in an exemplary operating scenario, the camera is configured to capture at least one real-world image that covers at least seventy-five percent of the semi-reflective surface.

The term "processor" refers to a device or system configured to control overall operations, including processing of input data from cameras and trackers, generation or retrieval of image content, and control of display output. In one example, the processor may be implemented as a processor of the display, a processor of a computing device (e.g., a laptop, tablet, smartphone), or a processor of a cloud server providing remote computational services.

The present disclosure further relates to the method as described above. Various embodiments and variants disclosed above with respect to the system described in the first aspect, apply mutatis mutandis to the method in the second aspect.

Optionally, the method further comprising:

when it is detected that the luminance of the given portion of the real-world light field is higher than the first predefined threshold luminance, identifying a plurality of portions of the semi-reflective surface for which a luminance of corresponding portions of the real-world light field passing therethrough toward the given eye is lower than the second predefined threshold luminance, based on the at least one real-world image and the relative position of the given eye with respect to the semi-reflective surface, wherein the second predefined threshold luminance is lower than the first predefined threshold luminance;

identifying a plurality of regions of the image, wherein light rays of the plurality of regions of the image are to be reflected from respective ones of the plurality of portions of the semi-reflective surface toward the given eye of the at least one user during display of the image; and when identifying the non-occupied region, selecting the non-occupied region from the plurality of regions of the image, based on the size of the graphical element.

A key technical benefit of identifying the plurality of portions of the semi-reflective surface where the luminance of the real-world light field is lower than the second predefined threshold luminance, and selecting the non-occupied region of the image based on the size of the graphical element, is improved adaptability of graphical element placement under visibility-impaired conditions. The identification of the plurality of portions and the corresponding plurality of regions of the image enables selection of a different region for repositioning the graphical element that maintains visibility of the graphical element identified as important by avoiding high-luminance regions that would otherwise reduce readability. The selection based on the size of the graphical element ensures that the repositioning occurs into the region that is sufficiently large to accommodate the graphical element without distortion or truncation. The method facilitates robust preservation of visual accessibility for critical graphical elements, even when multiple visibility constraints exist across different portions of the semi-reflective surface.

Optionally, in the method, the non-occupied region of the image is identified based further on a proximity of the non-occupied region to the given region of the image.

A key technical benefit of identifying the non-occupied region of the image based further on the proximity of the non-occupied region to the given region of the image is improvement in spatial continuity of graphical element repositioning under visibility impairment. The identification of the non-occupied region based on the proximity to the given region allows the graphical element identified as important to be repositioned close to an original location thereof, preserving alignment of the graphical element within the field of view of the at least one user. The method reduces perceptual discontinuity during repositioning and facilitates smoother transitions of graphical elements during adaptation to visibility changes. Further, maintaining the proximity between the graphical element and the original position of the graphical element enhances continuity of user perception and contributes to a more stable and intuitive user experience during operation of the heads-up display.

Optionally, the method further comprising:

identifying a given reflection region on the semi-reflective surface from which light rays emitted by a light-emitting surface of the display is reflected toward the given eye, based on: (a) the relative position of the given eye with respect to the semi-reflective surface, (b) the relative position and orientation of the semi-reflective surface with respect to the display, (c) a size and curvature of the semi-reflective surface, and (d) a size and curvature of the light-emitting surface;

when it is detected that the luminance of the given portion of the real-world light field is higher than the first predefined threshold luminance, determining a modified reflection region on the semi-reflective surface by excluding, from the given reflection region, the given portion of the semi-reflective surface from which the light rays of the given region of the image are to be reflected toward the given eye;

determining a three-dimensional (3D) view frustum corresponding to the given eye, based on the modified reflection region on the semi-reflective surface, and the relative position of the given eye with respect to the semi-reflective surface;

for a given virtual depth at which the graphical element is to be presented, determining a frustum cross-section of the 3D view frustum at the given virtual depth relative to the given eye;

determining at least one position on the frustum cross-section corresponding to the non-occupied region of the image;

positioning at least one spatial anchor at the at least one position on the frustum cross-section;

determining a position for the graphical element on the frustum cross-section relative to the at least one spatial anchor; and when modifying the image, repositioning the graphical element at the determined position.

A key technical benefit of identifying the given reflection region on the semi-reflective surface, determining the modified reflection region by excluding portions affected by high luminance, and repositioning the graphical element identified as important relative to the at least one spatial anchor on the frustum cross-section, is maintenance of visibility of graphical elements under dynamic lighting conditions. The determining of the 3D view frustum based on the modified reflection region ensures that placement of the graphical element identified as important accounts for changes in available reflective areas caused by visibility impairments. The determining of the frustum cross-section at the given virtual depth and positioning the at least one spatial anchor within the available region allows controlled placement of graphical elements in geometrically valid and easily perceptible positions. The method facilitates repositioning of the graphical element identified as important within the field of view of the at least one user based on changes in visibility conditions, while maintaining spatial consistency and reducing disruption to perception of the at least one user during operation of the heads-up display.

Optionally, the method further comprising:

when it is detected that the luminance of the given portion of the real-world light field is higher than the first predefined threshold luminance, determining when a non-occupied region cannot be identified in the image to reposition the graphical element; and when it is determined that a non-occupied region cannot be identified, identifying a neighbouring region of the image adjacent to the given region of the image; and modifying the image to present a visual indicator in the neighbouring region, wherein the visual indicator is presented to notify the at least one user about the graphical element being presented at the given region of the image.

A key technical benefit of determining when the non-occupied region cannot be identified for repositioning the graphical element identified as important, and presenting the visual indicator in the neighbouring region of the image, is preservation of awareness of the at least one user of graphical elements that become temporarily obstructed. The identifying of the neighbouring region adjacent to the given region and presentation of the visual indicator enable continuous communication of the presence and relevance of the graphical element identified as important, even when direct repositioning of the graphical element is not feasible. The visual indicator facilitates prompting of the at least one user to adjust the viewing position relative to the semi-reflective surface to regain visibility of the graphical element identified as important. The method thereby provides the technical benefits of enhancing operational continuity and reducing loss of critical information during conditions where visibility impairments prevent repositioning of graphical elements within immediately available non-occupied regions.

DETAILED DESCRIPTION OF THE DRAWINGS

FIG. 1 shows an exemplary implementation of a system 100, in accordance with an embodiment of the present disclosure. The system 100 is implemented within a vehicle, such as a car driven by at least one user 116. The system 100 comprises a tracker 102, a display 104 and an optical combiner 106 arranged on an optical path of the display 104 and on an optical path of a real-world light field of a real-world environment 108 (represented using a sun positioned above the vehicle). As shown, the optical combiner 106 is implemented as a windshield of the vehicle driven by the at least one user 116. The optical combiner 106 has a semi-reflective surface 110.

The system 100 further comprises at least one camera 112 arranged facing the semi-reflective surface 110 and at least one processor 114. As shown, the at least one processor 114 is connected to the tracker 102, the display 104 and the at least one camera 112.

The at least one processor 114 is configured to:

determine relative positions of eyes of at least one user 116 with respect to the semi-reflective surface 110, using the tracker 102; and generate or retrieve an image to be displayed. As shown, the image to be displayed comprises a graphical element showing an arrow indicating a driving direction and a graphical element showing a map with a location chevron indicating a driving destination.

The at least one processor 114 is further configured to:

for a given region of the image that represents a graphical element identified as important or having an importance level higher than a first predefined threshold importance level, determine a given portion of the semi-reflective surface 110 from which light rays of the given region of the image are to be reflected toward a given eye of the at least one user 116 during display of the image, based on a relative position of the given eye with respect to the semi-reflective surface 110, a relative position and orientation of the semi-reflective surface 110 with respect to the display 106, and a position of the given region in the image;

capture at least one real-world image using the at least one camera 112;

detect when a luminance of a given portion of the real-world light field passing through the given portion of the semi-reflective surface 110 toward the given eye is higher than a first predefined threshold luminance, based on the at least one real-world image and the relative position of the given eye with respect to the semi-reflective surface 110;

when it is detected that the luminance of the given portion of the real-world light field is higher than the first predefined threshold luminance, identify a non-occupied region of the image, wherein a luminance of a corresponding portion of the real-world light field passing through a corresponding portion of the semi-reflective surface 110 is lower than a second predefined threshold luminance, wherein the non-occupied region of the image is identified based on the at least one real-world image, the relative position of the given eye with respect to the semi-reflective surface 110, the relative position and orientation of the semi-reflective surface 110 with respect to the display 104, a position of the non-occupied region in the image, and a size of the graphical element; and modify the image to reposition the graphical element at the non-occupied region of the image; and display the image via the display for producing a synthetic light field, wherein the optical combiner 106 is employed to reflect the synthetic light field toward the eyes of the at least one user 116, whilst optically combining the synthetic light field with the real-world light field.

It may be understood by a person skilled in the art that FIG. 1 shows a simplified implementation of the system 100, for sake of clarity, which should not unduly limit the scope of the claims herein. The person skilled in the art will recognize many variations, alternatives, and modifications of embodiments of the present disclosure. For example, the system 100 can comprise additional components, such as, one or more additional trackers, one or more additional cameras, one or more additional displays, one or more additional optical combiners and so forth.

Figure 2:
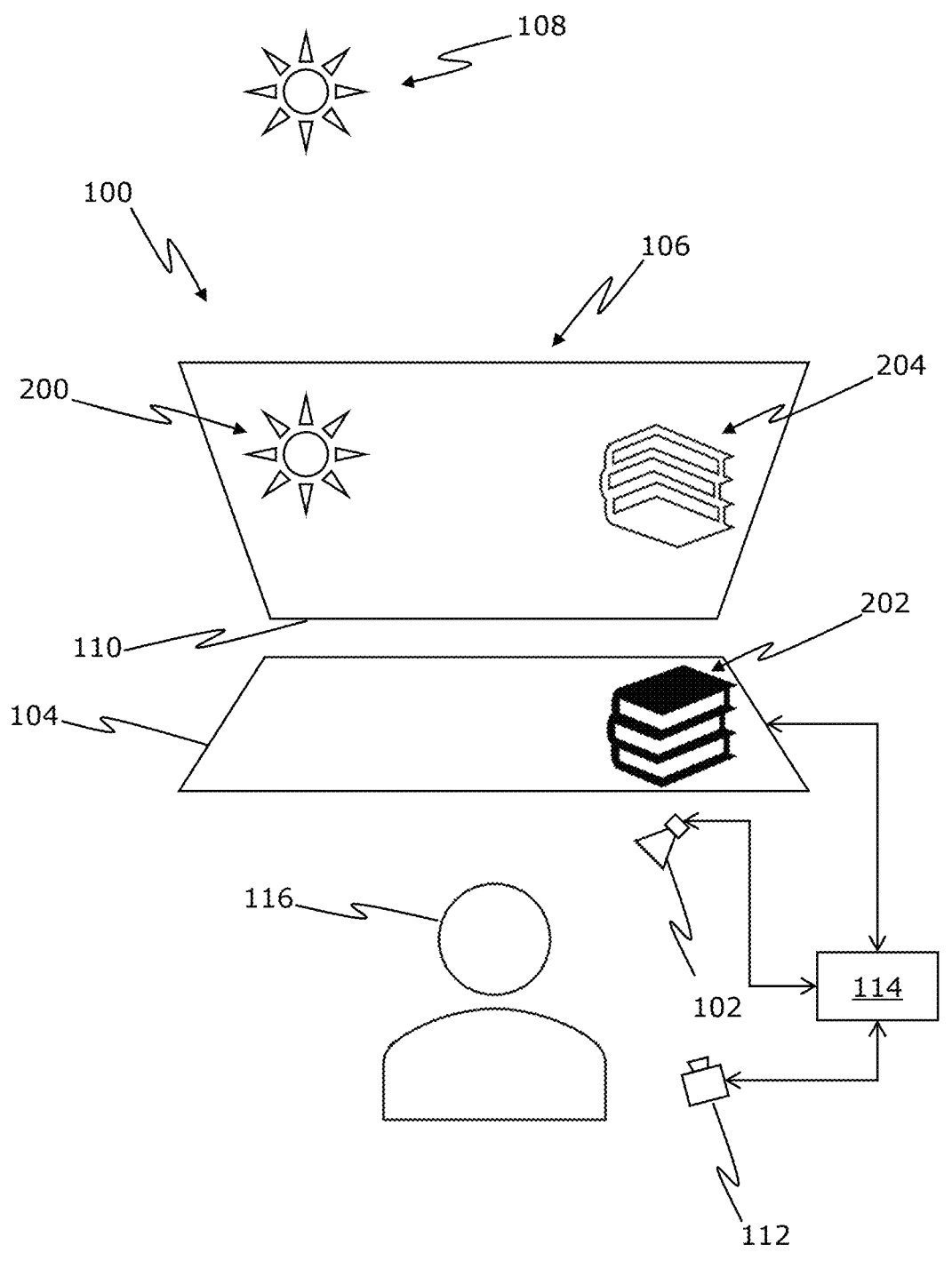
FIG. 2 shows an exemplary situation in which the system of FIG. 1 is implemented, in accordance with an embodiment of the present disclosure.

FIG. 2 shows an exemplary situation in which the system 100 of FIG. 1 is implemented, in accordance with an embodiment of the present disclosure. In the exemplary operating scenario, the system 100 detects luminance impairments and visibility obstructions affecting graphical elements presented to the eyes of the at least one user 116. As shown, a graphical element 118 (not shown to illustrate obscuration thereof by a reflection 200) is obscured by a reflection 200 of a sun on the semi-reflective surface 110, resulting in the graphical element 118 not being visible. Additionally, a stack of books 202 has been placed on the display 104, and a reflection 204 of the stack of books 202 is visible on the semi-reflective surface 110. The reflection 204 obscures the graphical element 120 (not shown to illustrate obscuration thereof by the reflection 204), thereby affecting visibility of the graphical element 120 through the semi-reflective surface 110 to the at least one user 116.

It may be understood by a person skilled in the art that FIG. 2 illustrates an exemplary situation in which the system 100 of FIG. 1 is implemented. The illustration is intended to depict a representative condition in the real-world environment under which the system 100 operates, and should not be construed as limiting the scope of the claims herein. The person skilled in the art will recognise that many variations, alternatives, and modifications of embodiments of the present disclosure are possible.

Figure 3:
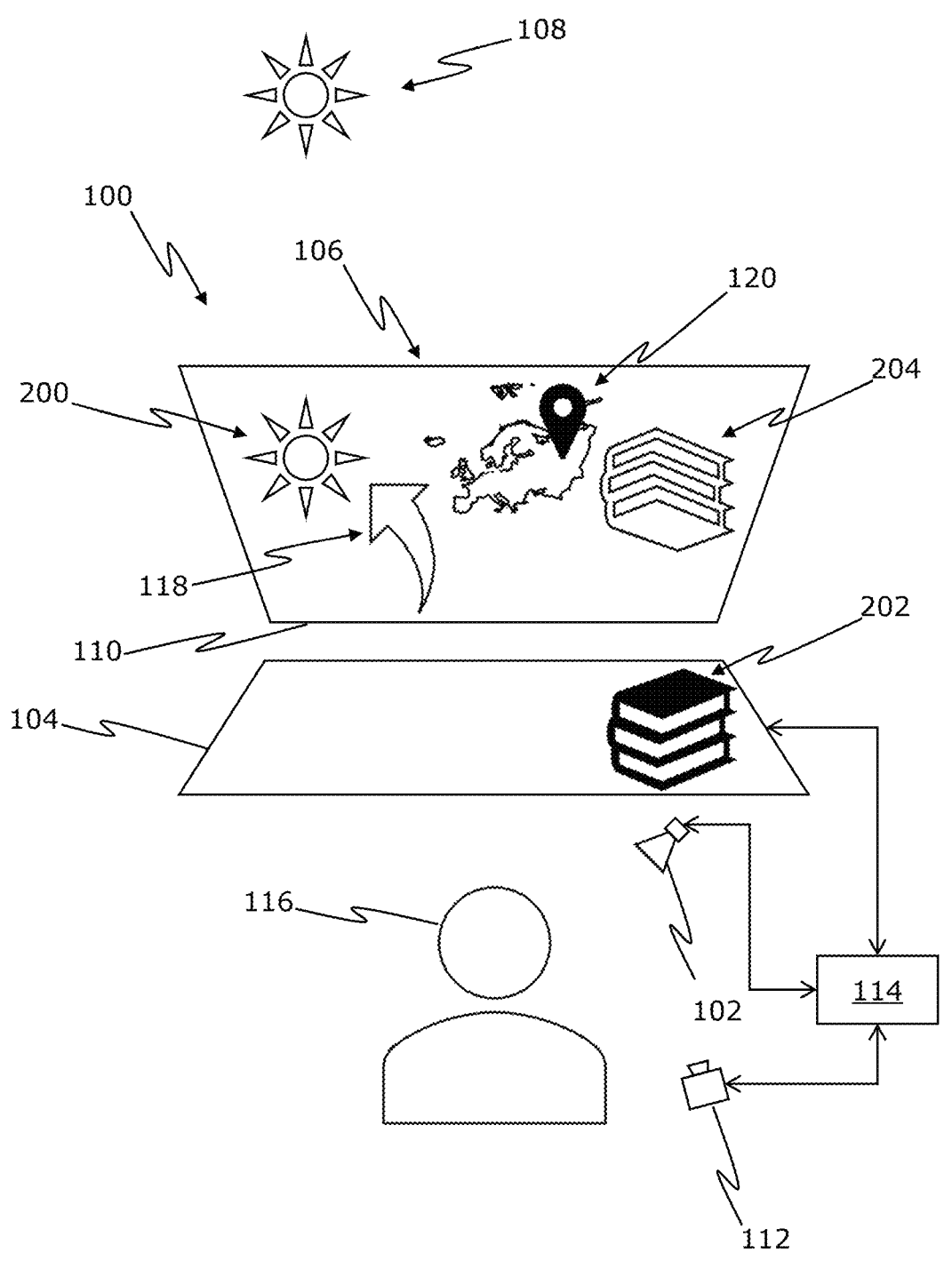
FIG. 3 shows an operation of the system in the exemplary situation shown in FIG. 2, in accordance with another embodiment of the present disclosure.

FIG. 3 shows an operation of the system 100 in the exemplary situation shown in FIG. 2, in accordance with an embodiment of the present disclosure. The system 100 modifies the image to reposition the graphical element 118 and the graphical element 120 affected by luminance impairments and visibility obstructions, thereby improving visibility of the graphical element 118 and the graphical element 120 to the eyes of the at least one user 116. As shown, the graphical element 118 and the graphical element 120 have been repositioned toward a middle region of the image away from the reflection 200 of the sun associated with the real-world environment 108 and the reflection 204 of the stack of books 202, respectively. As a result of the repositioning, the graphical element 118 and the graphical element 120 are presented through portions of the semi-reflective surface 110 that are not obstructed, thereby improving visibility of the graphical element 118 and the graphical element 120 to the at least one user 116.

Figure 4:
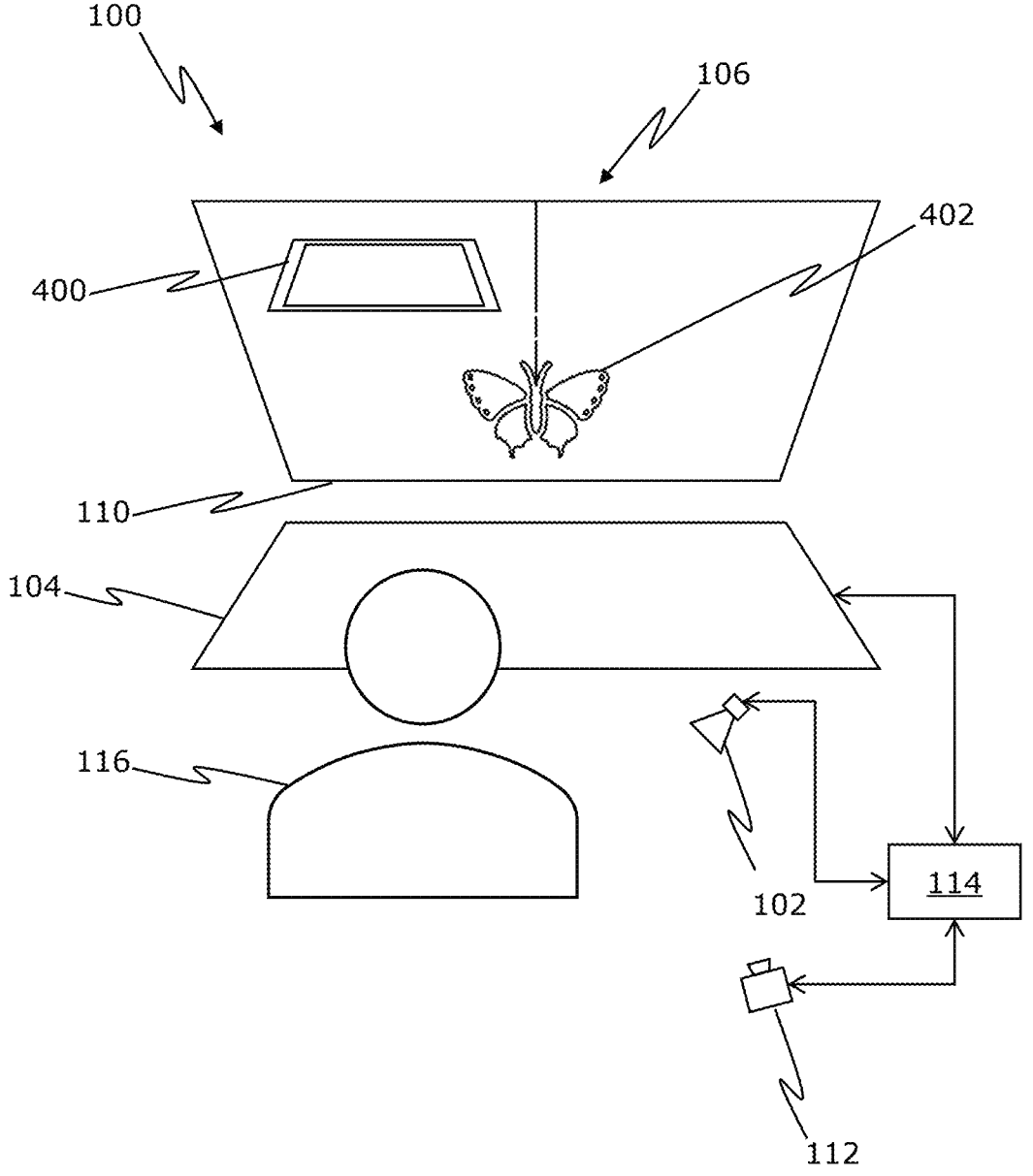
FIG. 4 shows an exemplary implementation of the system of FIG. 1, in accordance with an embodiment of the present disclosure.

FIG. 4 shows an exemplary implementation of the system 100 of FIG. 1, in accordance with an embodiment of the present disclosure. As shown, static occluders (400, 402) are present along an optical path of the semi-reflective surface 110. The static occluders 400, 402 comprise a sun visor 400 that partially occludes the semi-reflective surface 110 of the optical combiner 106 and a hanging object 402 shaped as a butterfly positioned near a rearview mirror that further occludes a portion of the semi-reflective surface 110. The sun visor 400 and the hanging object 402 represent the static occluders that can obstruct portions of the semi-reflective surface 110 through which the synthetic light field and the real-world light field are to be viewed by the at least one user 116. The system 100 identifies the occluded portions of the semi-reflective surface 110 and repositions the graphical elements of the image to maintain visibility through non-occluded portions of the optical combiner 106.

Figure 5:
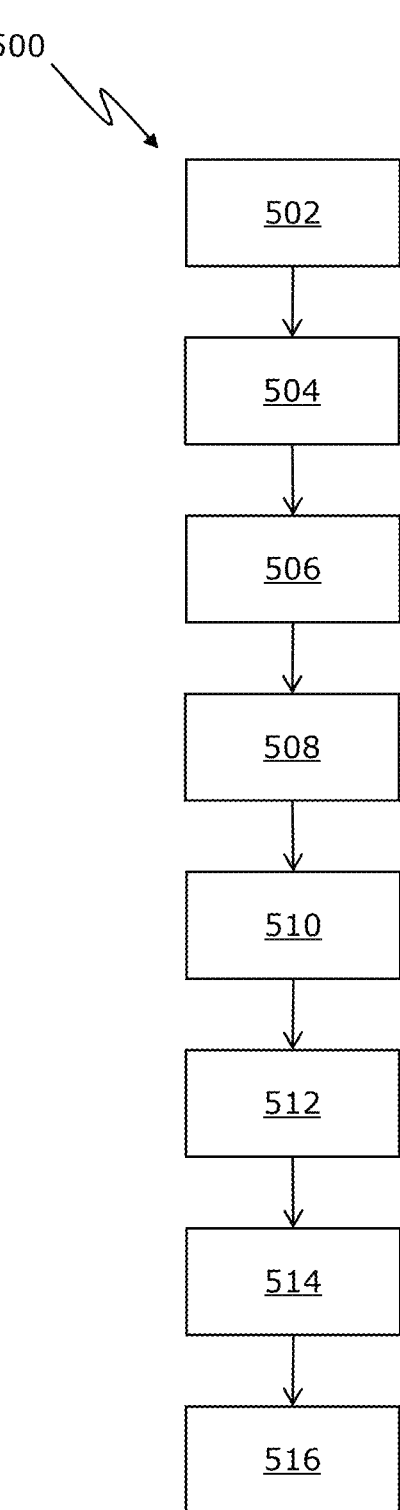
FIG. 5 shows steps of a method, in accordance with an embodiment of the present disclosure.

FIG. 5 shows steps of a method 500, in accordance with an embodiment of the present disclosure.

At step 502, relative positions of eyes of at least one user with respect to a semi-reflective surface of an optical combiner are determined using a tracker, wherein the optical combiner is arranged on an optical path of a display and on an optical path of a real-world light field of a real-world environment.

At step 504, an image to be displayed via the display is generated or retrieved.

At step 506, for a given region of the image that represents a graphical element identified as important or having an importance level higher than a first predefined threshold importance level, a given portion of the semi-reflective surface is determined from which light rays of the given region of the image are to be reflected toward a given eye of the at least one user during display of the image, based on a relative position of the given eye with respect to the semi-reflective surface, a relative position and orientation of the semi-reflective surface with respect to the display, and a position of the given region in the image.

At step 508, at least one real-world image is captured using at least one camera, wherein the at least one camera is arranged facing the semi-reflective surface.

At step 510, a luminance of a given portion of the real-world light field passing through the given portion of the semi-reflective surface toward the given eye is detected, based on the at least one real-world image and the relative position of the given eye with respect to the semi-reflective surface.

At step 512, when it is detected that the luminance of the given portion of the real-world light field is higher than a first predefined threshold luminance, a non-occupied region of the image is identified, wherein a luminance of a corresponding portion of the real-world light field passing through a corresponding portion of the semi-reflective surface is lower than a second predefined threshold luminance, and wherein the non-occupied region of the image is identified based on the at least one real-world image, the relative position of the given eye with respect to the semi-reflective surface, the relative position and orientation of the semi-reflective surface with respect to the display, a position of the non-occupied region in the image, and a size of the graphical element. Further, At step 514, the image is modified to reposition the graphical element at the non-occupied region of the image.

At step 516, the image is displayed via the display for producing a synthetic light field, wherein the optical combiner is employed to reflect the synthetic light field toward the eyes of the at least one user whilst optically combining the synthetic light field with the real-world light field.

The aforementioned steps are only illustrative and other alternatives can also be provided where one or more steps are added, one or more steps are removed, or one or more steps are provided in a different sequence without departing from the scope of the claims herein.

The invention claimed is:

1. A system comprising:
   a tracker;
   a display;
   an optical combiner arranged on an optical path of the display and on an optical path of a real-world light field of a real-world environment, the optical combiner having a semi-reflective surface;
   at least one camera arranged facing the semi-reflective surface; and
   at least one processor configured to:
      determine relative positions of eyes of at least one user with respect to the semi-reflective surface, using the tracker;
      generate or retrieve an image to be displayed;
      for a given region of the image that represents a graphical element identified as important or having an importance level higher than a first predefined threshold importance level, determine a given portion of the semi-reflective surface from which light rays of the given region of the image are to be reflected toward a given eye of the at least one user during display of the image, based on a relative position of the given eye with respect to the semi-reflective surface, a relative position and orientation of the semi-reflective surface with respect to the display, and a position of the given region in the image;

capture at least one real-world image using the at least one camera;

detect when a luminance of a given portion of the real-world light field passing through the given portion of the semi-reflective surface toward the given eye is higher than a first predefined threshold luminance, based on the at least one real-world image and the relative position of the given eye with respect to the semi-reflective surface;

when it is detected that the luminance of the given portion of the real-world light field is higher than the first predefined threshold luminance, identify a non-occupied region of the image, wherein a luminance of a corresponding portion of the real-world light field passing through a corresponding portion of the semi-reflective surface is lower than a second predefined threshold luminance, wherein the non-occupied region of the image is identified based on the at least one real-world image, the relative position of the given eye with respect to the semi-reflective surface, the relative position and orientation of the semi-reflective surface with respect to the display, a position of the non-occupied region in the image, and a size of the graphical element; and modify the image to reposition the graphical element at the non-occupied region of the image; and display the image via the display for producing a synthetic light field, wherein the optical combiner is employed to reflect the synthetic light field toward the eyes of the at least one user, whilst optically combining the synthetic light field with the real-world light field.

2. The system of claim 1, wherein the at least one processor is configured to:

when it is detected that the luminance of the given portion of the real-world light field is higher than the first predefined threshold luminance, identify a plurality of portions of the semi-reflective surface for which a luminance of corresponding portions of the real-world light field passing therethrough toward the given eye is lower than the second predefined threshold luminance, based on the at least one real-world image and the relative position of the given eye with respect to the semi-reflective surface, wherein the second predefined threshold luminance is lower than the first predefined threshold luminance;

identify a plurality of regions of the image, wherein light rays of the plurality of regions of the image are to be reflected from respective ones of the plurality of portions of the semi-reflective surface toward the given eye of the at least one user during display of the image; and when identifying the non-occupied region, select the non-occupied region from the plurality of regions of the image, based on the size of the graphical element.

3. The system of claim 1, wherein the non-occupied region of the image is identified based further on a proximity of the non-occupied region to the given region of the image.

4. The system of claim 1, wherein the at least one processor is configured to:

identify a given reflection region on the semi-reflective surface from which light rays emitted by a light-emitting surface of the display is reflected toward the given eye, based on: (a) the relative position of the given eye with respect to the semi-reflective surface, (b) the relative position and orientation of the semi-reflective surface with respect to the display, (c) a size and curvature of the semi-reflective surface, and (d) a size and curvature of the light-emitting surface;

when it is detected that the luminance of the given portion of the real-world light field is higher than the first predefined threshold luminance, determine a modified reflection region on the semi-reflective surface by excluding, from the given reflection region, the given portion of the semi-reflective surface from which the light rays of the given region of the image are to be reflected toward the given eye;

determine a three-dimensional (3D) view frustum corresponding to the given eye, based on the modified reflection region on the semi-reflective surface, and the relative position of the given eye with respect to the semi-reflective surface;

for a given virtual depth at which the graphical element is to be presented, determine a frustum cross-section of the 3D view frustum at the given virtual depth relative to the given eye;

determine at least one position on the frustum cross-section corresponding to the non-occupied region of the image;

position at least one spatial anchor at the at least one position on the frustum cross-section;

determine a position for the graphical element on the frustum cross-section relative to the at least one spatial anchor; and when modifying the image, reposition the graphical element at the determined position.

5. The system of claim 1, wherein the at least one processor is configured to:

when it is detected that the luminance of the given portion of the real-world light field is higher than the first predefined threshold luminance, determine when a non-occupied region cannot be identified in the image to reposition the graphical element; and when it is determined that a non-occupied region cannot be identified, identify a neighbouring region of the image adjacent to the given region of the image; and modify the image to present a visual indicator in the neighbouring region, wherein the visual indicator is presented to notify the at least one user about the graphical element being presented at the given region of the image.

6. A method comprising:

determining relative positions of eyes of at least one user with respect to a semi-reflective surface of an optical combiner, using a tracker, wherein the optical combiner is arranged on an optical path of a display and on an optical path of a real-world light field of a real-world environment;

generating or retrieving an image to be displayed via the display;

for a given region of the image that represents a graphical element identified as important or having an importance level higher than a first predefined threshold importance level, determining a given portion of the semi-reflective surface from which light rays of the given region of the image are to be reflected toward a given eye of the at least one user during display of the image, based on a relative position of the given eye with respect to the semi-reflective surface, a relative position and orientation of the semi-reflective surface with respect to the display, and a position of the given region in the image;

capturing at least one real-world image using at least one camera, wherein the at least one camera is arranged facing the semi-reflective surface;

detecting when a luminance of a given portion of the real-world light field passing through the given portion of the semi-reflective surface toward the given eye is higher than a first predefined threshold luminance, based on the at least one real-world image and the relative position of the given eye with respect to the semi-reflective surface;

when it is detected that the luminance of the given portion of the real-world light field is higher than the first predefined threshold luminance, identifying a non-occupied region of the image, wherein a luminance of a corresponding portion of the real-world light field passing through a corresponding portion of the semi-reflective surface is lower than a second predefined threshold luminance, wherein the non-occupied region of the image is identified based on the at least one real-world image, the relative position of the given eye with respect to the semi-reflective surface, the relative position and orientation of the semi-reflective surface with respect to the display, a position of the non-occupied region in the image, and a size of the graphical element; and modifying the image to reposition the graphical element at the non-occupied region of the image; and displaying the image via the display for producing a synthetic light field, wherein the optical combiner is employed to reflect the synthetic light field toward the eyes of the at least one user, whilst optically combining the synthetic light field with the real-world light field.

7. The method of claim 6, further comprising:

when it is detected that the luminance of the given portion of the real-world light field is higher than the first predefined threshold luminance, identifying a plurality of portions of the semi-reflective surface for which a luminance of corresponding portions of the real-world light field passing therethrough toward the given eye is lower than the second predefined threshold luminance, based on the at least one real-world image and the relative position of the given eye with respect to the semi-reflective surface, wherein the second predefined threshold luminance is lower than the first predefined threshold luminance;

identifying a plurality of regions of the image, wherein light rays of the plurality of regions of the image are to be reflected from respective ones of the plurality of portions of the semi-reflective surface toward the given eye of the at least one user during display of the image; and when identifying the non-occupied region, selecting the non-occupied region from the plurality of regions of the image, based on the size of the graphical element.

8. The method of claim 6, wherein the non-occupied region of the image is identified based further on a proximity of the non-occupied region to the given region of the image.

9. The method of claim 6, further comprising:

identifying a given reflection region on the semi-reflective surface from which light rays emitted by a light-emitting surface of the display is reflected toward the given eye, based on: (a) the relative position of the given eye with respect to the semi-reflective surface, (b) the relative position and orientation of the semi-reflective surface with respect to the display, (c) a size and curvature of the semi-reflective surface, and (d) a size and curvature of the light-emitting surface;

when it is detected that the luminance of the given portion of the real-world light field is higher than the first predefined threshold luminance, determining a modified reflection region on the semi-reflective surface by excluding, from the given reflection region, the given portion of the semi-reflective surface from which the light rays of the given region of the image are to be reflected toward the given eye;

determining a three-dimensional (3D) view frustum corresponding to the given eye, based on the modified reflection region on the semi-reflective surface, and the relative position of the given eye with respect to the semi-reflective surface;

for a given virtual depth at which the graphical element is to be presented, determining a frustum cross-section of the 3D view frustum at the given virtual depth relative to the given eye;

determining at least one position on the frustum cross-section corresponding to the non-occupied region of the image;

positioning at least one spatial anchor at the at least one position on the frustum cross-section;

determining a position for the graphical element on the frustum cross-section relative to the at least one spatial anchor; and when modifying the image, repositioning the graphical element at the determined position.

10. The method of claim 6, further comprising:

when it is detected that the luminance of the given portion of the real-world light field is higher than the first predefined threshold luminance, determining when a non-occupied region cannot be identified in the image to reposition the graphical element; and when it is determined that a non-occupied region cannot be identified, identifying a neighbouring region of the image adjacent to the given region of the image; and modifying the image to present a visual indicator in the neighbouring region, wherein the visual indicator is presented to notify the at least one user about the graphical element being presented at the given region of the image.

\* \* \* \* \*